WILLIAM CLEMSON, OF MIDDLETOWN, NEW YORK.

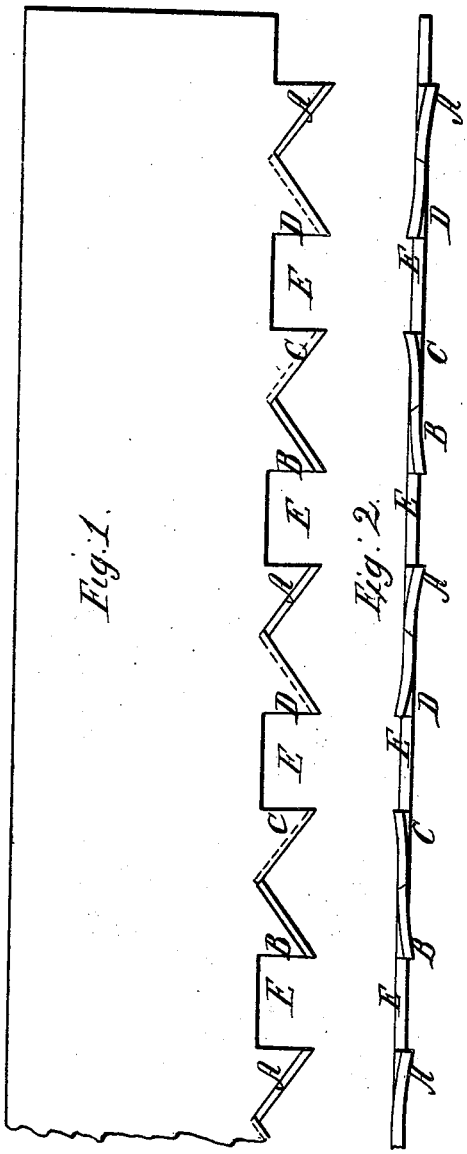

Letters Patent No. 87,910, dated March 16, 1869.

IMPROVEMENT IN SAWS.

The Schedule referred to in these Letters Patent and making part of the same.

*To all whom it may concern:*

Be it known that I, WILLIAM CLEMSON, of Middletown, Orange county, New York, have invented a new and useful Improvement in Saws; and I do hereby declare the following is a full, clear, and exact description of the construction and operation of the same, reference being had to the annexed drawings, making a part of this specification, in which—

Figure 1 is a side view of a section of saw-plate, showing my improvement in the construction, arrangement, and dressing of the teeth.

The improvement in crosscutting-saws here shown consists in the arrangement of ripping-teeth, cut or inserted in the edge of the saw-blade in pairs, and pointing in opposite directions, and dressed for work as hereinafter made known.

The teeth, A and B, have a double action, both being set over the same way, and filed bevelling on their backs, and square on their vertical, or front edges. They each cut and clear alternately for each other, the saw having a reciprocatory motion.

Thus, when the tooth A is drawn to the left, it makes a smooth drawing-cut, with its bevelled edge, into the wood. The tooth B follows, with its square vertical edge, and removes what the tooth A has cut into, and a little more, and that in proportion to the size of the space E, which space may be varied in extent to suit hard or soft wood.

The proportions shown are suitable for a crosscut-saw worked by hand.

When the motion of the saw is reversed, tooth A follows in the wake of B, and performs exactly the same as does tooth B when following in the cut made by A, and so on with one of each contiguous pairs along the edge of the saw-blade.

The teeth C and D are set over on the opposite side of the plate to teeth A and B, and so on in pairs, alternately, to each side the blade, to allow the saw to work freely through the wood.

It will be seen that I combine the advantages of cutting and clearing-teeth in one tooth, and by so doing avoid sacrificing space on the blade to "clearers," and labor and files to keeping them in order.

My arrangement and form of the teeth make it quite easy to retain the saw in its best cutting-condition, with ordinary skill and care both in dressing and using; whereas, saws constructed with alternate and separate cutters and clearers, are found to be of but little value in common practice. To be of any advantage, a nice adjustment is required in the relative lengths of the two kinds of teeth. Being difficult to dress properly, it is generally imperfectly done on this kind of saw.

The improvement herein set forth is simple and easy of management, and works freely and easily, and is intended to remove the defects referred to. Therefore,

What I claim as my invention, and desire to secure by Letters Patent, is—

A crosscut-saw having the teeth arranged in pairs, and divided from the next pair by a dust-space, and having the teeth A B set to one side of the blade, and the teeth C D set to the opposite side of the blade, and constructed substantially in the manner and for the purpose described.

WM. CLEMSON.

Witnesses:
G. R. KIMBALL,
LEMUEL WHEELER.